United States Patent
Pinn et al.

(10) Patent No.: US 8,643,476 B2
(45) Date of Patent: Feb. 4, 2014

(54) DYNAMIC LABELING OF PATCH PANEL PORTS

(75) Inventors: Gregory Pinn, Dallas, TX (US); Chin Choi-Feng, Carrollton, TX (US); David Beihoff, Dallas, TX (US); G. Mabud Choudhury, Warren, NJ (US); Michael German, Secaucus, NJ (US); Matias Peluffo, Guadalajara (ES); George Brooks, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 823 days.

(21) Appl. No.: 12/826,118

(22) Filed: Jun. 29, 2010

(65) Prior Publication Data

US 2011/0008996 A1    Jan. 13, 2011

Related U.S. Application Data

(60) Provisional application No. 61/221,306, filed on Jun. 29, 2009.

(51) Int. Cl.
*H04Q 5/22* (2006.01)

(52) U.S. Cl.
USPC ...... 340/10.6; 340/687; 340/10.1; 340/10.42; 439/489; 439/491

(58) Field of Classification Search
USPC ........ 340/687, 10.1–10.6; 361/600, 627, 636, 361/633; 439/491, 489
See application file for complete search history.

(56) References Cited

U.S. PATENT DOCUMENTS

| 5,483,467 | A | 1/1996 | Krupka et al. |
|---|---|---|---|
| 5,721,672 | A * | 2/1998 | Costa et al. ................... 361/801 |
| 6,002,331 | A | 12/1999 | Laor |
| 6,222,908 | B1 | 4/2001 | Bartolutti et al. |
| 6,285,293 | B1 | 9/2001 | German et al. |
| 6,330,307 | B1 * | 12/2001 | Bloch et al. ..................... 379/25 |
| 6,350,148 | B1 | 2/2002 | Bartolutti et al. |
| 6,424,710 | B1 | 7/2002 | Bartolutti et al. |

(Continued)

FOREIGN PATENT DOCUMENTS

| EP | 1 796 403 A2 | 6/2007 |
|---|---|---|
| GB | 2 347 507 A | 9/2000 |

(Continued)

OTHER PUBLICATIONS

International Preliminary Report for PCT/US2010/040329 mailed Sep. 22, 2011.

(Continued)

*Primary Examiner* — George Bugg
*Assistant Examiner* — Sharmin Akhter
(74) *Attorney, Agent, or Firm* — Myers Bigel Sibley & Sajovec, P.A.

(57) ABSTRACT

A patch panel for a communications patching system includes a plurality of connector ports. Each connector port is configured to detect insertion and removal of a patch cord. A controller is electrically coupled to the connector ports and monitors patch cord interconnections. An electronic display is positioned adjacent the connector ports and displays port identification information and real-time patch cord connection information for each respective connector port. The displayed patch cord connection information is dynamically updated by the controller as a patch cord is inserted or removed from a respective connector port.

23 Claims, 10 Drawing Sheets

(56) References Cited

U.S. PATENT DOCUMENTS

| | | | |
|---|---|---|---|
| 6,784,802 B1 * | 8/2004 | Stanescu | 340/687 |
| 7,170,393 B2 | 1/2007 | Martin | |
| 7,176,898 B2 * | 2/2007 | Litwiller | 345/173 |
| 7,193,422 B2 | 3/2007 | Velleca et al. | |
| 7,374,101 B2 | 5/2008 | Kaneko | |
| 7,605,707 B2 * | 10/2009 | German et al. | 340/572.8 |
| 8,248,208 B2 * | 8/2012 | Renfro, Jr. | 340/10.1 |
| 2006/0049942 A1 | 3/2006 | Sakama et al. | |
| 2006/0110977 A1 | 5/2006 | Matthews | |
| 2006/0148279 A1 | 7/2006 | German et al. | |
| 2008/0122579 A1 | 5/2008 | German et al. | |
| 2010/0109892 A1 | 5/2010 | Fariello et al. | |
| 2010/0210135 A1 | 8/2010 | German et al. | |

FOREIGN PATENT DOCUMENTS

| | | |
|---|---|---|
| GB | 2 347 751 A | 9/2000 |
| JP | 07094242 | 4/1995 |
| JP | 2005/235615 | 9/2005 |
| WO | WO 99/26426 | 5/1999 |
| WO | WO 2006/063023 A1 | 6/2006 |
| WO | WO 2009/052381 A2 | 4/2009 |

OTHER PUBLICATIONS

Notification of Transmittal of the International Search Report and The Written Opinion of the International Searching Authority, or the Declaration; International Search Report; Written Opinion of the International Searching Authority; Corresponding International Application No. PCT/US2010/040329; Mailing date: Oct. 4, 2010; 14 pages.

Notification of Transmittal of the International Search Report and The Written Opinion of the International Searching Authority, or the Declaration; International Search Report; Written Opinion of the International Searching Authority; Corresponding International Application No. PCT/US2005/044202; Mailing date: May 3, 2006; 10 pages.

Notification of Transmittal of the International Search Report and The Written Opinion of the International Searching Authority, or the Declaration; International Search Report; Written Opinion of the International Searching Authority; Corresponding International Application No. PCT/US2009/063337; Mailing date: Mar. 29, 2010; 10 pages.

Notification of Transmittal of the International Search Report and The Written Opinion of the International Searching Authority, or the Declaration; International Search Report; Written Opinion of the International Searching Authority; Corresponding International Application No. PCT/US2010/024567; Mailing date: Jul. 1, 2010; 12 pages.

Notification of Transmittal of the International Search Report and The Written Opinion of the International Searching Authority, or the Declaration; International Search Report; Written Opinion of the International Searching Authority; Corresponding International Application No. PCT/US2007/024382; Mailing date: May 28, 2008; 10 pages.

* cited by examiner

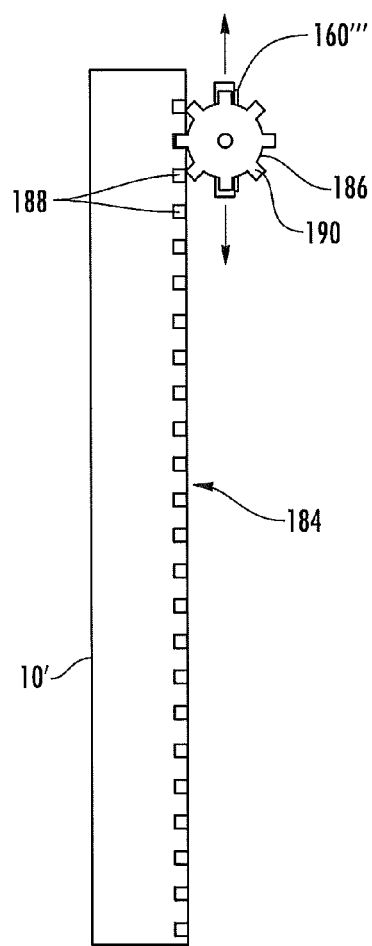
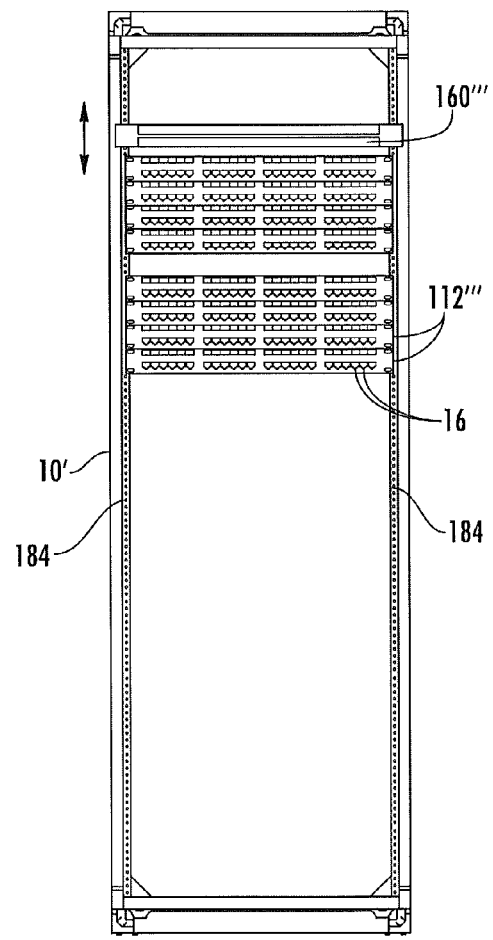
FIG. 8A
FIG. 8B

DYNAMIC LABELING OF PATCH PANEL PORTS

RELATED APPLICATIONS

This application claims priority from U.S. Provisional Patent Application No. 61/221,306, filed Jun. 29, 2009, the disclosure of which is hereby incorporated herein in its entirety.

FIELD OF THE INVENTION

The present invention relates generally to communications patching systems and, more particularly, to patch panels for communications patching systems.

BACKGROUND OF THE INVENTION

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers may also terminate within a telecommunications closet.

A patching system is typically used to interconnect the various telecommunication lines within a telecommunications closet. In a telecommunications patching system, all of the telecommunication lines are terminated within a telecommunications closet in an organized manner. The organized terminations of the various lines are provided via the structure of the telecommunications closet. A mounting frame having one or more racks is typically located in a telecommunications closet. The telecommunications lines terminate on the racks, as is explained below. It is noted that the patching systems described herein may be used in connection with data center environments, providing interconnection between servers, switches, storage devices, and other data center equipment, as well as office/LAN environments.

Referring to FIG. 1, a typical prior art rack 10 is shown. The rack 10 retains a plurality of patch panels 12 that are mounted to the rack 10. On each of the patch panels 12 are located port assemblies 14. The illustrated port assemblies 14 each contain a plurality of optical communication connector ports (e.g., SC, ST, LC ports, etc.) 16. Each of the different communication connector ports 16 is hard wired to one of the communication lines. Accordingly, each communication line is terminated on a patch panel 12 in an organized manner. In small patch systems, all communication lines may terminate on the patch panels of the same rack. In larger patch systems, multiple racks may be used, wherein different communication lines terminate on different racks.

In FIG. 1, interconnections between the various communication lines are made using patch cords 20. Both ends of each patch cord 20 are terminated with connectors 22. One end of a patch cord 20 is connected to a connector port 16 of a first communication line and the opposite end of the patch cord 20 is connected to a connector port 16 of a second communications line. By selectively connecting the various lines with patch cords 20, any combination of communication lines can be interconnected.

In office/LAN environments, as employees move, change positions, and/or add and subtract lines, the patch cords in a typical telecommunications closet may be rearranged quite often. In data center environments, patching information requires updates based on provisioning/addition/subtraction of servers, switches, storage devices, and other data center equipment. Therefore, it is important to maintain a log or tracing system which provides port identification information, patch cord connection information and/or patch cord identification information. This information may be recorded and updated on handwritten or preprinted labels adjacent to the connector ports. Handwritten or preprinted patch cord labels (i.e., labels affixed or clipped to patch cords) may also provide connectivity information by providing a unique identifier for each patch cord. The overall interconnections of the various patch cords in a telecommunications closet may be monitored by manually updating a paper or computer based log.

These solutions suffer from numerous drawbacks. Handwritten or preprinted labels offer limited space for documenting connectivity information and are subject to error if and when they are updated. Also, handwritten or preprinted labels may obscure each other, especially in high density installations, and may be difficult to read in dark environments, such as telecommunications closets. Furthermore, handwritten or preprinted labels do not provide an automated log or tracing system for the patch cords. Where a paper or computer based log is employed, technicians may neglect to update the log each and every time a change is made. These manually updated logs are also prone to erroneous entries.

Therefore, regardless of the procedure used, the log or tracing system inevitably becomes less than 100% accurate and a technician has no way of reading where each of the patch cords begins and ends. Accordingly, each time a technician needs to change a patch cord, the technician manually traces that patch cord between two connector ports. To perform a manual trace, the technician locates one end of a patch cord and then manually follows the patch cord until he/she finds the opposite end of that patch cord. Once the two ends of the patch cord are located, the patch cord can be positively identified.

It may take a significant amount of time for a technician to manually trace a particular patch cord, particularly within a collection of other patch cords. Furthermore, manual tracing may not be completely accurate and technicians may accidentally go from one patch cord to another during a manual trace. Such errors may result in misconnected telecommunication lines which must be later identified and corrected. Also, it may be difficult to identify the correct port to which a particular patch cord end should be connected or disconnected. Thus, ensuring that the proper connections are made can be very time-consuming, and the process is prone to errors in both the making of connections and in keeping records of the connections. Accordingly, a need exists for accurately and quickly tracing, detecting and identifying the ends of patch cords in a telecommunications closet. A need also exists for accurately and quickly knowing which ports are connected by patch cords.

SUMMARY

In view of the above discussion, patch panels for communications patching systems and methods of displaying patch cord connection information for a connector port of a patch panel in communications patching systems are provided. According to some embodiments of the present invention, a patch panel includes a plurality of connector ports, wherein each connector port is configured to detect insertion therein, and removal therefrom, of a patch cord connector. A controller is electrically coupled to the connector ports and monitors patch cord interconnections therewith. An electronic display is positioned adjacent the connector ports and displays port identification information and real-time patch cord connection information for each respective connector port. The displayed patch cord connection information is dynamically updated by the controller as a patch cord is inserted and removed from a respective connector port. In some embodiments of the present invention, each connector port is configured to read an identifier of a patch cord connector inserted therewithin.

In other embodiments of the present invention, the patch panel includes a user input device positioned adjacent to the electronic display, wherein the user input device is operably associated with the electronic display such that user manipulation of the user input device allows the user to scroll and view multiple lines of information via the electronic display.

In some embodiments, the electronic display is integrated with or visible through a front surface of the patch panel. In other embodiments, the patch panel includes a plurality of arms extending outwardly away from a front surface of the patch panel, wherein the electronic display is attached to distal ends of the arms and positioned substantially in front of the connector ports.

A method of displaying patch cord connection information for a connector port of a patch panel in communications patching systems includes detecting insertion of a patch cord connector in a patch panel connector port, detecting an identifier of the patch cord connector and displaying in real time the detected patch cord connector identifier via an electronic display. In some embodiments of the present invention, the method further includes detecting insertion of a connector at the opposite end of the patch cord in another patch panel connector port and displaying in real time an identification of the other connector port via the electronic display. In other embodiments of the present invention, the method further includes displaying identifications of end points of a communications link associated with the connector port.

A patch panel system includes: a frame configured to support equipment mounted thereto in a plurality of spaced-apart mounting locations; one or more patch panels mounted to the frame in spaced-apart locations; at least one controller associated with the one or more patch panels, wherein the at least one controller monitors and logs patch cord connectivity for the one or more patch panels; and a display movably secured to the frame. The display is movable along the frame and configured to display patch cord connectivity information monitored by the at least one controller for the one or more patch panels.

In some embodiments, the display is movable along the frame and positionable adjacent each of the one or more patch panels, wherein the display is configured to display patch cord connectivity information for a patch panel adjacent to the display. In some embodiments, the one or more patch panels comprises a plurality of patch panels, and the display is configured to simultaneously display patch cord connectivity information for a patch panel adjacent to the display and at least one other patch panel.

A patch panel system includes: a frame configured to support equipment mounted thereto in a plurality of spaced-apart mounting locations; a plurality of patch panels mounted to the frame in spaced-apart locations; at least one controller associated with the plurality of patch panels, wherein the at least one controller monitors and logs patch cord connectivity for the plurality of patch panels; and a display removably secured to a side of the frame. The display is configured to simultaneously display patch cord connectivity information monitored by the at least one controller for the plurality of patch panels It is noted that any one or more aspects or features described with respect to one embodiment may be incorporated in a different embodiment although not specifically described relative thereto. That is, all embodiments and/or features of an embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 8A is a side view of a frame of a patch panel system, according to some embodiments of the present invention.

FIG. 8B is a front view of the frame of FIG. 8A.

DETAILED DESCRIPTION OF THE INVENTION

Figure 1:
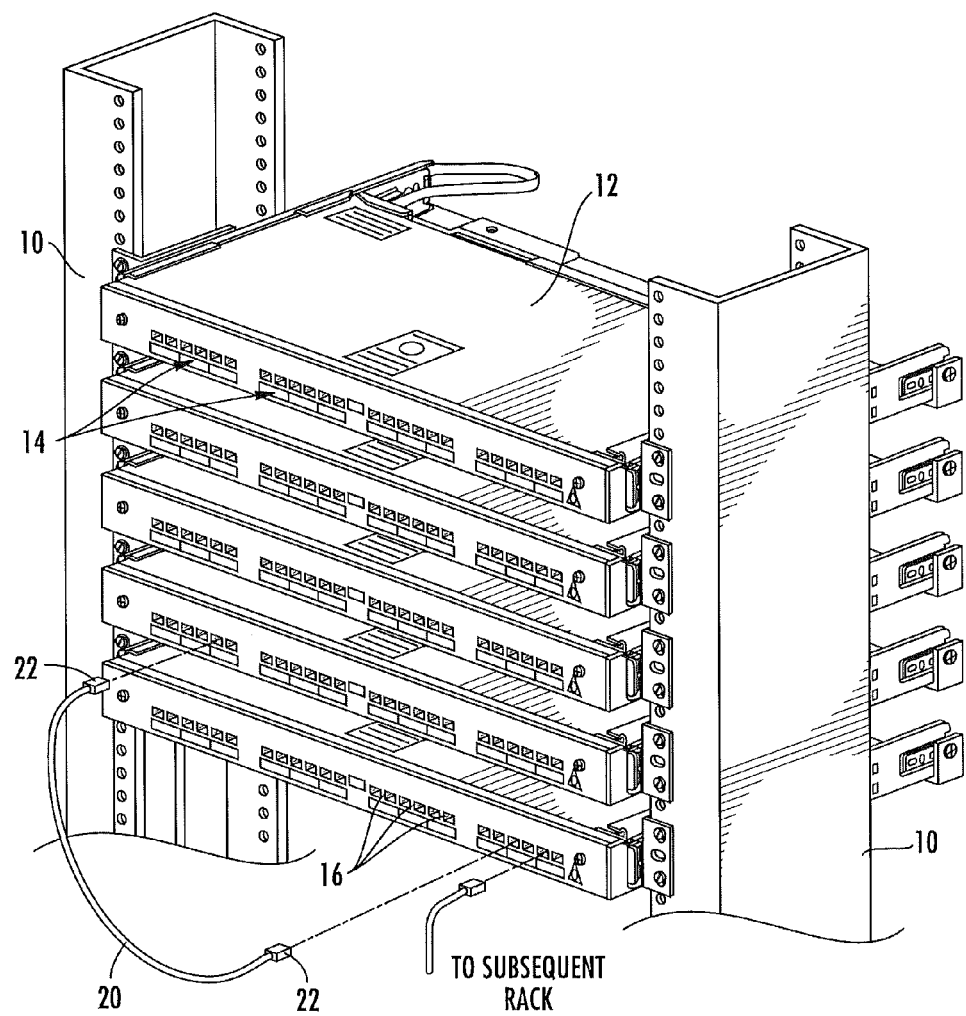
FIG. 1 is a perspective view of a typical prior art communication rack assembly containing multiple patch panels with connector ports that are selectively interconnected by patch cords.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

In the drawings, the thickness of lines and elements may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figure 2:
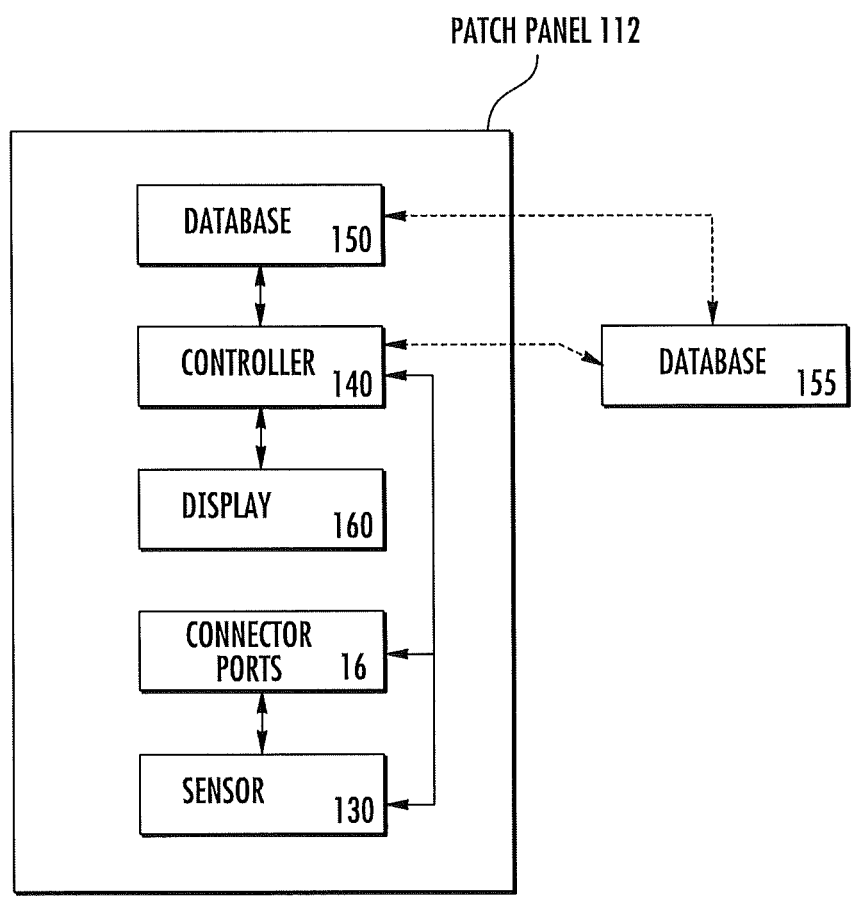
FIG. 2 is a block diagram of a patch panel and an optional external database, according to embodiments of the present invention.

Referring now to FIG. 2, a patch panel 112, according to some embodiments of the present invention, is illustrated. The illustrated patch panel 112 includes a plurality of connector ports 16. A patch cord 20 (FIG. 1) has opposite ends with a connector 22 secured to each end. Each connector 22 is configured to be removably secured within a respective connector port 16.

Each connector port 16 is configured to detect when a patch cord connector 22 is inserted within, and removed from, the respective connector port 16. This detection is generally accomplished by any type of sensor 130, including, but not limited to, mechanical sensors (e.g., mechanical switches), passive optical based sensors, RFID sensors and electrical based sensors. The sensor 130 may be integrated with the connector port 16 or may be adjacent to the connector port 16.

Each connector 22 of a respective patch cord 20 has the same unique identifier (i.e., uniquely paired identifier) in order to accurately track connectivity. In some embodiments, the identifier is in the form of programmable memory. In some embodiments, the programmable memory is Electrically Erasable Programmable Read-Only Memory (EEPROM). In some particular embodiments, the identifier may be a 1-Wire® device manufactured by Maxim Integrated Products. The identifier and the sensor 130, described above, may share components.

A controller 140 is typically electrically coupled to the connector ports 16 and/or the sensors 130. Therefore, the controller 140 is capable of monitoring when a patch cord 20 is inserted into any connector port 16, or removed from any connector port 16. The controller 140 is also capable of automatically keeping an accurate log of all changes that have occurred to the patch cords 20. In some embodiments, the controller 140 is external to the patch panel 112. For example, the controller 140 may be a controller mounted on a rack 10 (FIG. 1). In some embodiments, the controller 140 is electromagnetically coupled to the connector ports 16 and/or the sensors 130. For example, the controller 140 and the connector ports 16 and/or the sensors 130 could communicate via wireless signals rather than by direct electrical coupling.

The controller 140 may communicate with an internal or local database 150. The database 150 monitors and logs patch cord interconnections with the connector ports 16. Such information may be stored in memory, such as EEPROM, associated with the database 150.

In some embodiments, an external database 155 may be included. Either database 150, 155 may comprise a software database that is dedicated to monitor and log patch cord interconnections with the connector ports 16. Either database 150, 155 may comprise a web based or Microsoft Excel based program, and may provide user friendly connectivity information and connectivity logs, for example via a display associated with a personal computer, etc. In some embodiments, the external database 155 communicates with the controller 140. In some other embodiments, the external database 155 communicates with the internal database 150. The external database 155 and the controller 140 and/or the internal database 150 may communicate via wireless signals (e.g., by electro-magnetic coupling) or by direct electrical coupling.

The patch panel 112 includes or is in communication with a display 160. More particularly, the display 160 is in communication with the controller 140. The display 160 may communicate with the controller 140 via wireless signals (e.g., by electro-magnetic coupling) or by direct electrical coupling. The display 160 displays port identification information and real-time patch cord connection information for each respective connector port 16, as described in more detail below. The displayed patch cord connection information for each connector port 16 is dynamically updated by the controller 140 as a patch cord 20 is inserted and removed from a respective connector port 16. As used herein, dynamically updating information (e.g., patch cord connection information) is defined as updating the information in real-time.

In some embodiments, the display 160 is positioned adjacent the connector ports 16. For example, the patch panel may include a front surface 113 (FIG. 3), and the display 160 may be integrated with the front surface 113 or may be visible through the front surface 113. The front surface 113 may be removable. In particular, the front surface 113 may be removed and/or replaced to repair or upgrade the patch panel 112. For example, the front surface 113 including the display 160 may be installed on a patch panel that previously included no labels or paper labels. Moreover, the front surface 113 including the display 160 may be installed when a previous display has malfunctioned or if the user wants to upgrade the display.

In some embodiments, a printed circuit board (PCB) is secured to the patch panel 112 and electrically coupled to the display 160. The PCB may be positioned adjacent to the display 160 and may provide power to the display 160. The PCB may provide interconnection with a controller and/or a controller circuit, such as the controller 140 and/or a circuit associated with the controller 140. In this regard, the PCB may serve to electrically couple the controller 140 and the display 160. As described below, in some embodiments, the display 160 comprises a plurality of adjacent, spaced-apart portions. The PCB or a plurality of PCBs may provide interconnection between the spaced-apart portions.

Figure 3:
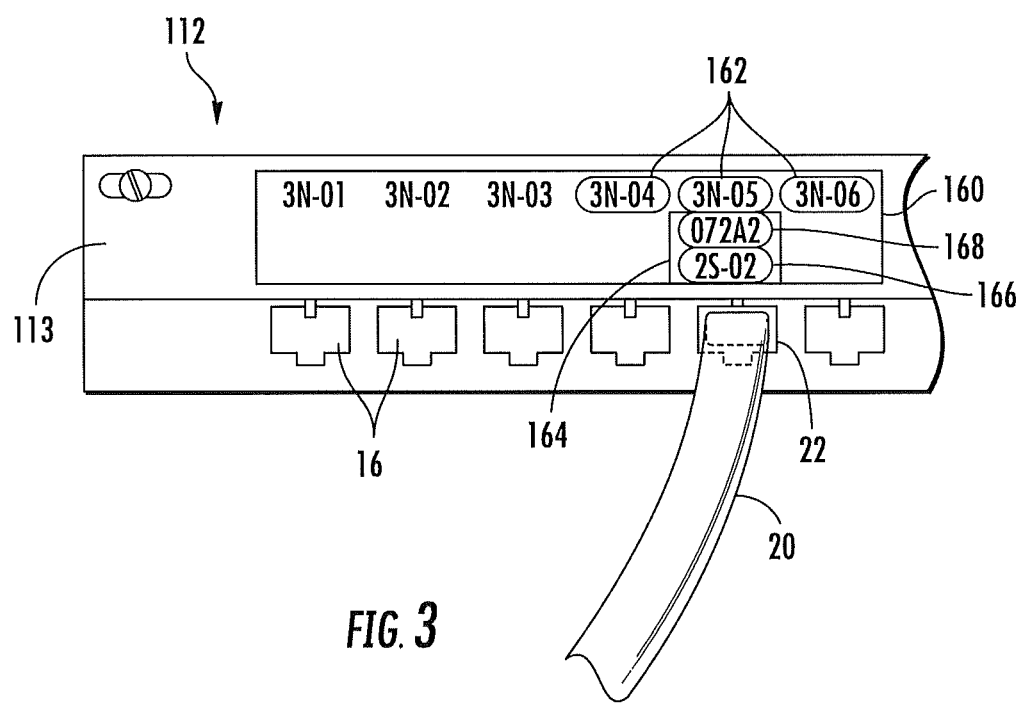
FIG. 3 is a fragmented front view of a patch panel, according to embodiments of the present invention.

Turning to FIG. 3, and according to some embodiments of the present invention, the display 160 is positioned adjacent to the connector ports 16. The display 160 is configured to display port identification information 162. The port identification information 162 identifies each connector port 16 on the display 160 adjacent to the respective connector port 16. In the embodiment shown in FIG. 3, the port identification information 162 is displayed adjacent every connector port 16, regardless of whether a patch cord 20 is inserted therein. In other embodiments, the port identification information 162 may be displayed only adjacent to connector ports 16 that have patch cords 20 inserted therein.

Patch cord connection information 164 may further be displayed on the display 160 adjacent the connector ports 16. The patch cord connection information 164 may be displayed adjacent the connector ports 16 when a patch cord 20 is inserted therein. In this regard, the patch cord information 164 is dynamically updated by the controller 140 as a patch cord 20 is inserted and removed from a respective connector port 16.

In some embodiments, and as shown in FIG. 3, the patch cord connection information 164 may include end point connection information 166 to accurately locate the end point (i.e., a different connector port 16) of any patch cord 20. Furthermore, because the connectors 22 of a respective patch cord 20 have the same unique identifier, the patch cord connection information 164 may also include patch cord identification information 168 based on the unique identifier of the patch cord 20. As shown in FIG. 3, the patch cord connection information 164 may be displayed only adjacent to connector ports 16 that have patch cords 20 inserted therein.

In the embodiment exemplified in FIG. 3, the display 160 is positioned above the connector ports 16. In this regard, port identification information 162 and/or patch cord connection information 164 for each connector port 16 appear directly above the respective connector port 16. In some other embodiments, the display 160 may be positioned beneath the connector ports 16 such that port identification information 162 and/or patch cord connection information 164 for each connector port 16 appear directly below the respective connector port 16. The display 160 may be mounted on or integrated with the patch panel 112 adjacent the connector ports 16. Alternatively, the display 160 may be positioned such that the display 160 is visible through a surface of the patch panel 112 adjacent the connector ports 16. As described above, the patch panel 112 may include a front surface 113, and the display 160 may be integrated with the front surface 113 or may be visible through the front surface 113.

The display 160 may be capable of displaying more detailed connectivity information about each of the connector ports 16. Such information may include the end points of the communications link associated with a particular connector port 16 (e.g., switch and wall outlet points). The detailed connectivity information for each connector port 16 may take up multiple lines on the display 160. However, because of space and other limitations, it may not be possible for the display 160 to simultaneously display this detailed connectivity information for all the connector ports 16. This is especially the case if the display 160 is already displaying port identification information 162 and/or patch cord connection information 164 for each connector port 16.

According to some embodiments, manipulation of a user input device 170 (FIG. 4) allows a user to navigate between different layers of information on the display 160. The user input device 170 may comprise a rotatable scroll wheel. According to some embodiments, pressing the scroll wheel takes a user from a mode such as the one seen in FIG. 3, wherein port identification information 162 and/or patch cord connection information 164 is displayed, to a mode such as the one seen in FIG. 4, in which detailed connectivity information 172 associated with a particular connector port 16 is displayed. Such information may include the end points of the communications link associated with a particular connector port 16 (e.g., switch and wall outlet points). More particularly, the detailed connectivity information may represent a full communications link (i.e., inclusive of endpoints beyond the patch cord connection information 164). For example, as illustrated in FIG. 4, each block of information in the connectivity information 172 may represent an identifier for a building, floor, room, rack, patch panel, connector port or the like.

Figure 4:
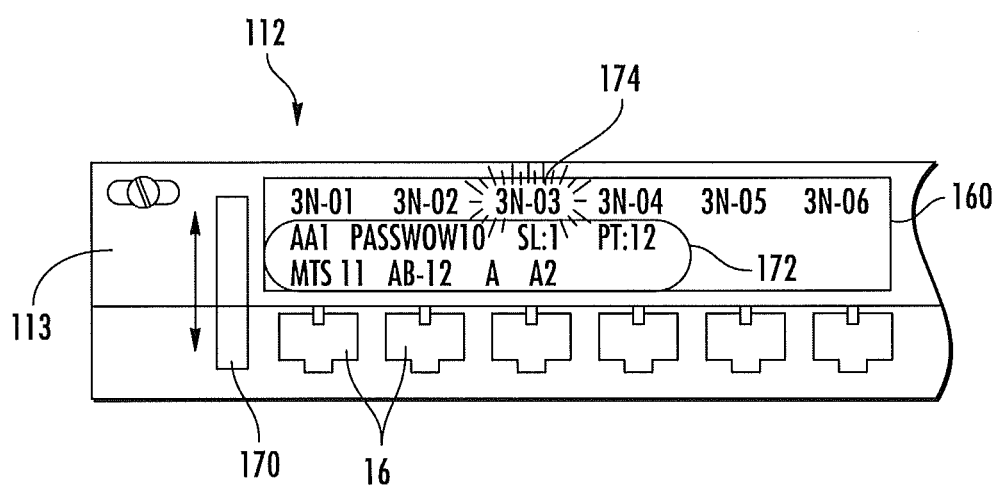
FIG. 4 is a fragmented front view of a patch panel, according to embodiments of the present invention.

Still referring to FIG. 4, once the wheel is pressed, it may then be rotated to scroll through the connector ports 16. As a particular port 16 is selected, its port identification 174 is highlighted and the detailed connectivity information 172 for that port 16 is displayed.

Although the user input device 170 has been exemplified as a rotatable scroll wheel, it is understood that the user input device 170 may comprise any device known to those skilled in the art. It is further contemplated that the detailed connectivity information 172 may scroll across the display 160 automatically rather than in a user initiated fashion.

As illustrated in FIG. 4, the user input device 170 may be adjacent to the display 160. In some embodiments, the user input device 170 may be positioned away from the display 160 and may allow the user to remotely perform at least some of the functions described above. The user input device 170 may be logically correlated to the display 160 to facilitate remote operation.

The display 160 and the connectivity information provided thereon may comply with ANSI/TIA/EIA/606A standards, which provide guidelines for record keeping, label placement and link identification. The ANSI/TIA/EIA/606A standards are an evolving set of standards. For example, the ANSI/TIA/EIA/606A standards are a revised version of the ANSI/TIA/EIA/606 standards. It is understood that the display 160 and the connectivity information provided thereon may comply with the most recent revision of the ANSI/TIA/EIA/606A standards or the equivalent. The display 160 and the connectivity information provided thereon may further comply with other national and international standards.

The display 160 may be capable of toggling between a custom labeling scheme, such as the modes shown in FIGS. 3 and 4, and an ANSI/TIA/EIA/606A (or like national or international standard) compliant scheme. The custom labeling scheme may represent a company or organization specific standard and may be a default setting. In some embodiments, the user may toggle between a custom labeling scheme and an ANSI/TIA/EIA/606A (or like national or international standard) compliant scheme using the user input device 170. In some embodiments, wherein the user input device 170 comprises a scroll wheel, the user may press the scroll wheel to toggle between a custom labeling scheme, such as the modes shown in FIGS. 3 and 4, and an ANSI/TIA/EIA/606A (or like national or international standard) compliant scheme.

In the embodiments shown in FIGS. 3 and 4, the display 160 comprises a plurality of adjacent, spaced-apart portions such that each portion spans only some (e.g., six) of the plurality of connector ports 16 of the patch panel 112. In some embodiments, each portion of the display 160 may have a footprint about 100 millimeters by about 15 millimeters. In some embodiments, each portion of the display 160 may have a footprint no greater than 2000 square millimeters. Alternatively, in some embodiments, the display 160 may be continuous and may be adjacent to all the connector ports 16 of the patch panel 112. The size of the display 160 and/or each portion of the display 160 may be consistent with and/or dependent on the mounting pitch of the connector ports 16. In this regard, the size of the display 160 and/or each portion of the display 160 may be consistent with and/or dependent on the type of connector ports 16 (e.g., SC, LC, RJ45, MPO) associated with the patch panel 112.

The display 160 may be any type of display, including, but not limited to, a liquid crystal display (LCD), a light emitting diode (LED) display an organic light emitting diode (OLED) display, and a vacuum fluorescent display (VCD). In some embodiments, the display 160 may be backlit and/or make use of inverted colors to ensure viewability in dark spaces such as cabinets and telecommunication closets.

Figure 5:
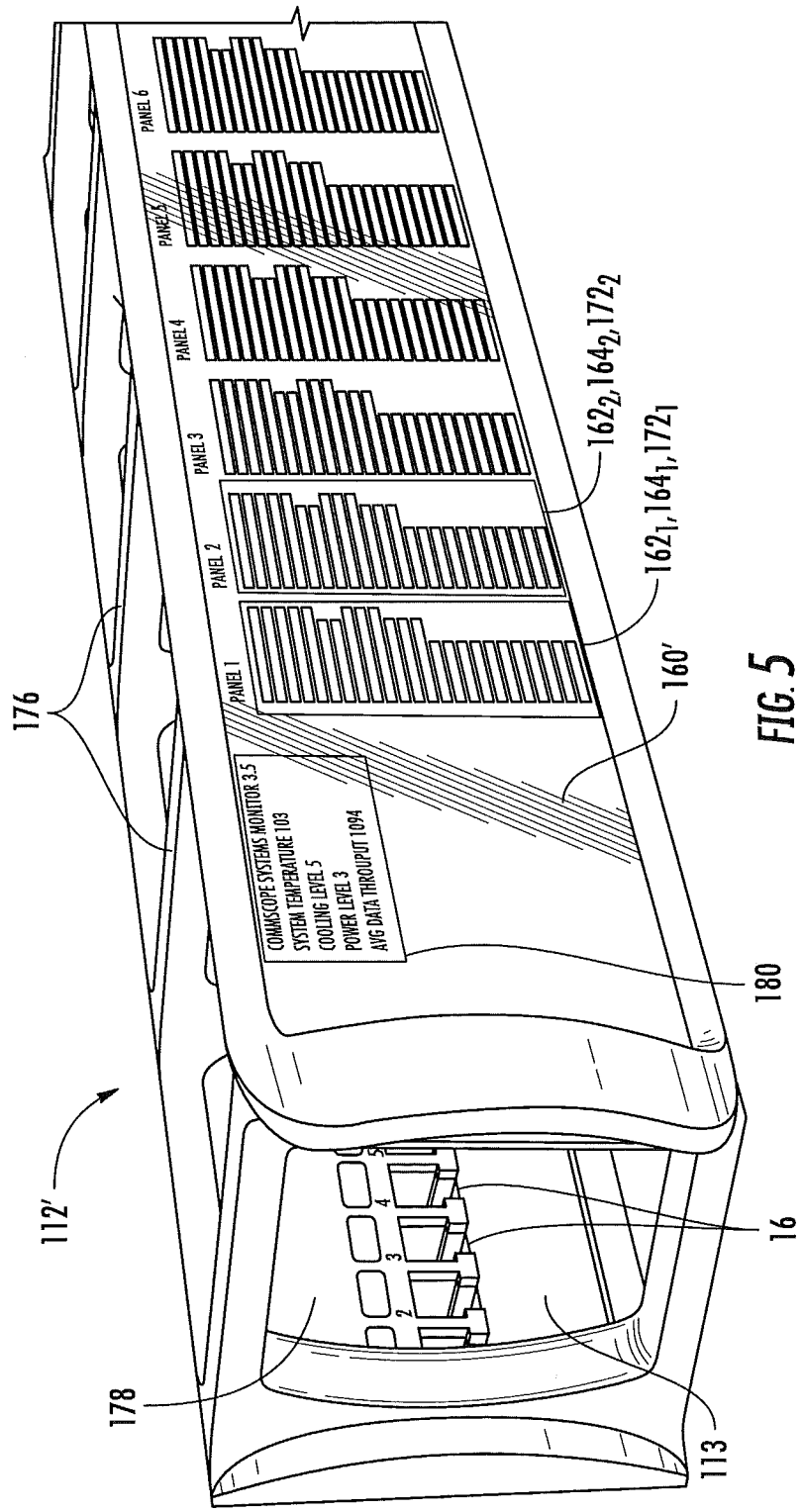
FIG. 5 is a fragmented perspective view of a patch panel, according to embodiments of the present invention.

Turning now to FIG. 5, a patch panel 112' is illustrated according to some embodiments of the present invention. The patch panel 112' shares the same features as the patch panel 112 described above with the following differences. The patch panel 112' includes a plurality of arms 176 extending outwardly away from the patch panel front surface 113. An electronic display 160' is attached to the distal ends of the arms 176 and positioned in front of or substantially in front of the connector ports 16. As illustrated, the arms 176 may include openings 178 through which the connector ports 16 and/or cords connected therewith may be accessed.

Thus, the display 160' may be spaced outwardly from the connector ports 16. This outward spacing allows for a relatively large display 160', as compared to the display 160 that is integrated with or visible through a front surface 113 of the patch panel 112. The display 160' may have a length that spans a substantial portion of a length of the patch panel 112'.

The relatively large size of the display 160' may allow for more information to be displayed simultaneously. For example, the port identification information $162_1$ and/or patch cord connection information $164_1$ and/or detailed connectivity information $172_1$ for each connector port 16 of the patch panel 112' may be displayed simultaneously. This information can include all of the data as described above in reference to the port identification information 162 and the patch cord connection information 164 and the detailed connectivity information 172.

The port identification information $162_1$ and/or patch cord connection information $164_1$ and/or detailed connectivity information $172_1$ associated with the connector ports 16 of the patch panel 112' may take up substantially all the space on the display 160'. In some other embodiments, because of its relatively large size, the display 160' can also display connectivity information associated with other patch panels (e.g., other patch panels on the same rack). For example, port identification information $162_2$ and/or patch cord connection information $164_2$ and/or detailed connectivity information $172_2$ for each connector port 16 of one or more different patch panels (e.g., a second patch panel on the same rack) may be displayed.

Thus, the display 160' may display connectivity information for each of the ports 16 of the patch panel 112' (i.e., each of the ports 16 of the patch panel 112' that the display 160' is adjacent to), or may display connectivity information for the patch panel 112' and one or more other patch panels of a rack or a cabinet. In some embodiments, various information may scroll along the display 160'; such scrolling may be automatic or may be user initiated. In some other embodiments, the display 160' may be a touch screen display. Such a touch screen may allow a user to scroll through information, or may allow a user to view information associated with different patch panels that are in communication with the display, for example.

In some embodiments, the display 160' may be configured to display general information 180 in addition to the connectivity information. Thus, the relatively large display 160' can conveniently display the general information 180, which is typically displayed remotely from a patch panel, along with labeling or connectivity information associated with the ports 16. The general information 180 can include, for example, environmental data such as the current system temperature. The general information 180 can also include such data as the current cooling level, the current power level, the current average data throughput, and the number or percent of connector ports available and/or in use.

In some embodiments, the display 160' is optically semi-transparent or semi-translucent to allow a user to see through the display 160' to the patch panel 112', and particularly to the connector ports 16 and cables connected therewith.

In some embodiments, the arms 176 can include channels or grooves (not shown) for routing of cables.

Turning now to FIGS. 8A and 8B, a patch panel system is illustrated. The system includes a frame 10' configured to support equipment mounted thereto in a plurality of spaced-apart mounting locations. In some embodiments, the frame 10' comprises a rack, such as the rack 10 illustrated in FIG. 1, for example. One or more patch panels 112''' are mounted to the frame 10' in spaced-apart locations. The system also includes at least one controller associated with the one or more patch panels 112'''. The at least one controller monitors and logs the patch cord connectivity for the one or more patch panels 112'''. In some embodiments, the controller is a rack controller. In some other embodiments, each patch panel 112''' can include a dedicated controller, such as the controller 140 described in detail above.

The patch panel system also includes a display 160''' movably secured to the frame 10'. The display 160''' is configured to display patch cord connectivity information monitored by the at least one controller for the one or more patch panels 112'''. The display 160''' is movable along the frame 10' (as indicated by the arrows). The display 160''' generally faces away from the patch panels 112'''.

In some embodiments, the frame 10' includes first and second vertically oriented members 184 in an opposing spaced-apart relationship. The display 160''' can be movably secured to at least one of the two vertically oriented members 184.

In the illustrated embodiment, the display 160''' is attached to a wheel 186. The frame 10' includes a plurality of apertures 188. For example, the apertures 188 may be positioned in one or both of the vertically oriented members 184 (the apertures 188 may be thought of as forming one or more "tracks"). The wheel 186 has a plurality of outwardly extending projections 190 sized and configured to fit within the apertures 188. The wheel 186 may be rotatable such that an adjacent projection 190 fits within an adjacent aperture 188 to allow translational movement of the display 160''' (i.e., up and down movement as indicated by the arrows) while also providing electronic communication between the display 160''' and the at least one controller.

The wheel 186 and/or the display 160''' may include mechanisms to prevent the display 160''' from rotating along with the wheel 186. For example, a gear may be connected to the wheel 186 and the display 160'' may be connected to the same gear or an associated gear, with the gear(s) configured to offset any rotational movement of the wheel 186. Alternatively, the display 160''' may be relatively loosely attached to a shaft associated with the wheel 186 such that, when the wheel 186 rotates, the shaft "slips" at its interface with the display 160'''. In this regard, the shaft urges the display 160''' up or down as the wheel 186 rotates, but does not urge the display 160' to rotate with the wheel. Other mechanisms to prevent rotation of the display 160''' are contemplated and are well known to those of skill in this art.

In some embodiments, each aperture 188 includes a contact therewithin. The contacts may provide power to the display 160''' and/or may provide communication to the display 160'''. In particular, the contacts may serve as a communication link between the at least one controller and the display 160'.

The apertures 188 may be positioned such that, when one of the projections 190 of the wheel 186 fits in one of the apertures 188, the display 160''' may be positioned adjacent the connector ports 16 associated with a particular patch panel 112'''. In other words, each aperture may be associated with a particular patch panel 112'''.

In various embodiments, the apertures 188 associated with a particular patch panel 112' may be positioned such that the display 160''' is above, below, or substantially in front of the patch panel 112' when a projection 190 of the wheel 186 is positioned in the aperture 188.

The connectivity information on the display may include information such as the port identification information 162 and/or patch cord connection information 164 and/or detailed connectivity information 172 described above in reference to FIGS. 3 and 4.

Furthermore, the display 160''' may be relatively large because it does not need to be integrated with or visible through a front surface of a patch panel 112'''. Thus, the display 160''' may be able to display information such as the port identification information $162_1$ and/or patch cord connection information $164_1$ and/or detailed connectivity information $172_1$ for each connector port 16 of the patch panel 112' adjacent the display 160''', and may also be able to display information such as the port identification information $162_2$ and/or patch cord connection information $164_2$ and/or detailed connectivity information $172_2$ for each connector port 16 of one or more different patch panels 112'', as described above in reference the display 160'. Moreover, the display 160''' may have a length that spans a substantial portion of a length of the patch panel 112'.

It is understood that the display 160''' may be movable along the frame 10' in ways other than described above. For example, the display 160''' may be connected to one or more carriers that are configured to move the display up and down the frame 10'. The carriers may be in tracks, such as continuous tracks, and may be controlled such that the carriers stop at certain vertical positions such that the display is positioned above, below, or substantially in front of a particular patch panel 112'''. The track can include a plurality of contacts, similar to the contacts described above with regard to the apertures 188, to provide power to the display 160''' and/or to communicate information to the display 160'''. In some other embodiments, the display 160''' may itself be movable and positionable along one or more tracks. For example, the display 160''' may include arms (such as the arms 176 associated with the display 160' in FIG. 5), and one or more of the arms could couple with one or more tracks.

There may be one track, or there may be more than one "track" in which a carrier or a wheel moves. For example, there may be two vertical continuous tracks or two vertically disposed plurality of apertures each forming a "track," and these tracks may be located in or on the frame 10' or may be in or on the vertically oriented members 184. Thus, a carrier or wheel may move along each of the tracks, and the display may be attached to both of the carriers or wheels.

The display 160''' may be moved manually by an operator to a desired position. In this regard, the apertures 188 and/or the projections 190 can be configured to provide audible and/or tactile feedback to a user to help ensure the projection 190 is properly positioned in the aperture 188. In embodiments using a carrier other than the wheel 186, the track may include grooves positioned to provide the same type of feedback to a user.

Furthermore, the display 160''' may be moved automatically in response to a command from a user. There may be a user interface device positioned on or adjacent the frame 10', the display 160''', or a user interface device may be positioned remotely away from the system. The display 160''' may comprise a touch screen, similar to as described in reference to the display 160' of FIG. 5, and the touch screen may allow a user to move and/or position the display 160''' as desired.

Figure 6:
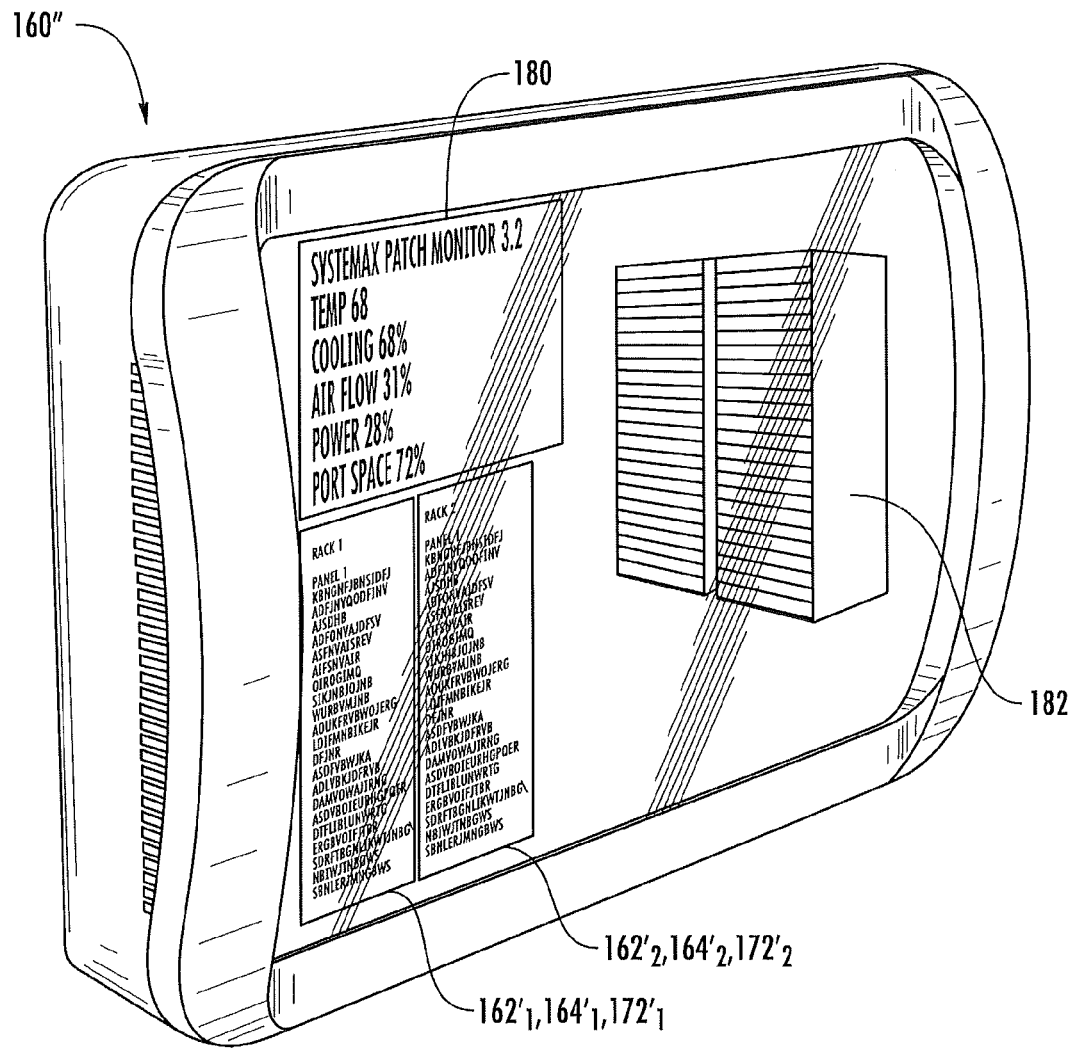
FIG. 6 is a perspective view of an electronic display for use with patch panels according to embodiments of the present invention.

Turning now to FIG. 6, a display 160'' for use with patch panels or groups of patch panels, according to some embodiments of the present invention, is illustrated. The display 160'' may be mounted to a patch panel, to a rack, to a stand, to a wall, etc. For example, the display 160'' could be removably mounted to a frame, such as the rack 10 illustrated in FIG. 1.

More particularly, the display 160'' could be removably mounted to a side of the rack. The display 160'' may be removably mounted at about eye-level for ease of use. Alternatively, the display 160'' could be portable; for example, the display 160'' could be the display of a wireless terminal such as a PDA or smartphone. Like the previously described displays 160, 160', and 160''', the display 160'' communicates with one or more controllers associated with one or more patch panels.

The display 160'' may be particularly useful in environments where it is desirable to monitor a plurality of patch panels, such as in a telecom closet or a data center. The display 160'' may be configured to display connectivity information associated with patch panels of one or more racks and/or one or more cabinets, for example. In the illustrated embodiment, port identification information $162'_1$ and/or patch cord connection information $162'_1$ and/or detailed connectivity information $172'_2$ of various patch panels of a first rack and port identification information $162'_2$ and/or patch cord connection information $164'_2$ and/or detailed connectivity information $172'_2$ of various patch panels of a second rack can be displayed. This information can include all of the data as described above in reference to the port identification information 162 and the patch cord connection information 164 and the detailed connectivity information 172.

In some embodiments, the display 160'' comprises a touch screen configured to show a graphical representation of the racks or cabinets, such as the graphical representation 182 showing a pair of racks. Thus, a user may be able to touch a particular panel in the graphical representation 182, to display that panel's connectivity information, such as the connectivity information $162'_1$ and $162'_1$. In other embodiments, a separate user interface (not shown) may allow a user to select a particular patch panel. In still other embodiments, various information may scroll along the display 160''; such scrolling may be automatic or may be user initiated.

The display 160'' may simultaneously display general information 180, such as the information described above in reference to the display 160' of FIG. 5.

It will be understood that various features of the displays 160, 160', 160'' and 160''' are interchangeable. It will further be understood that any of the displays are configured to display detailed connectivity information associated with a particular connector port. Such detailed connectivity information may include information about associated switches, servers, storage devices, and the like. It will also be understood that each of the displays 160, 160', 160'' and 160''' communicate with at least one controller, such as the controller 140 described above and illustrated in FIG. 2. This communication may be wireless or may be via direct electrical coupling.

As described in more detail above, the displays and/or their associated controllers may communicate with a database, such as an external database. The displays may be used with patch panels that do not include various sensing technology (e.g., no port sensing). These "passive panels" may be updated remotely (for example, using the database) such that any of the displays disclosed herein may still display comprehensive connectivity information. Manual updating may also be useful in other configurations, such as where the cords do not include identifiers.

Figure 7A:
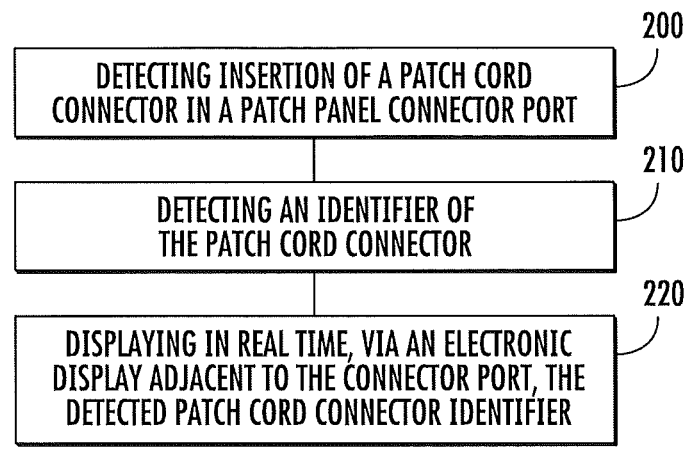
FIGS. 7A-7C are block diagrams illustrating methods of displaying connection information for a connector port of a patch panel in a communications patching system.
Figure 7B:
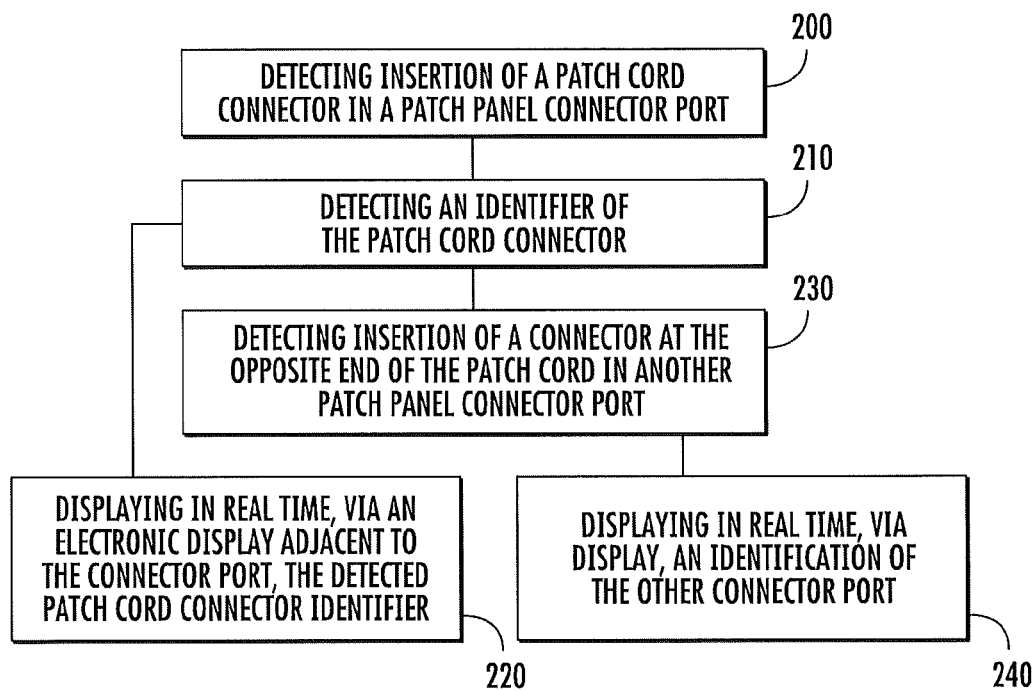
Figure 7C:
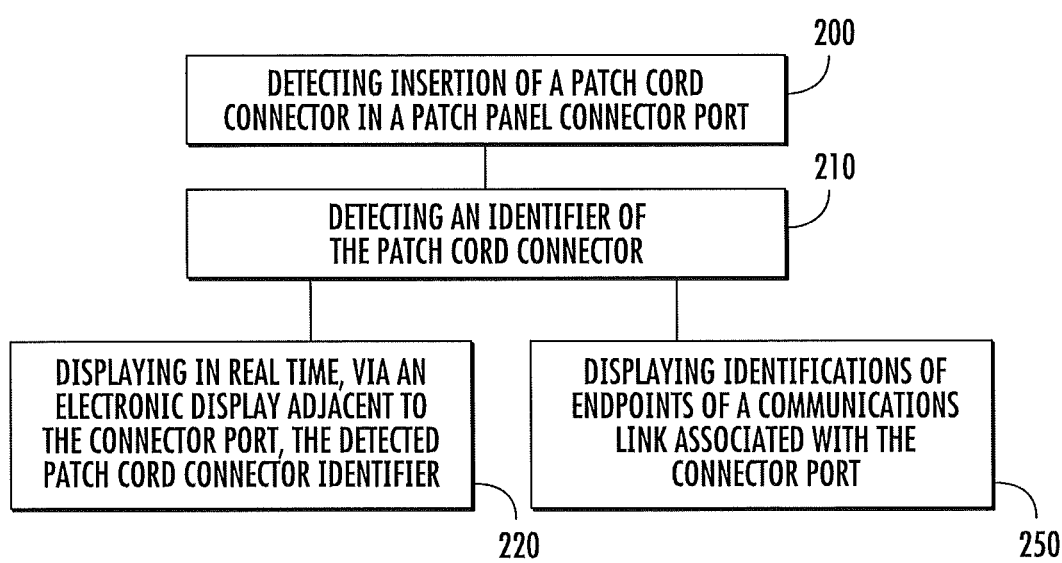

Methods of displaying patch cord connection information for a connector port of a patch panel, according to some embodiments of the present invention, are illustrated in FIGS. 7A-7C. One method (FIG. 7A) includes the steps of detecting insertion of a patch cord connector in a patch panel connector port (block 200), detecting an identifier of the patch cord connector (block 210) and displaying in real time the detected patch cord connector identifier via an electronic display adjacent to the connector port (block 220).

Another method (FIG. 7B) further includes detecting insertion of a connector at the opposite end of the patch cord in another patch panel connector port (block 230) and displaying an identification of the other connector port via the electronic display (block 240). Yet another method (FIG. 7C) further includes displaying identifications of end points of a communications link associated with the connector port (block 250).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A patch panel for a communications patching system, comprising:
    a plurality of connector ports, wherein each connector port is configured to detect insertion therein, and removal therefrom, of a patch cord connector;
    a controller electrically coupled to the connector ports that monitors patch cord interconnections therewith;
    an electronic display positioned adjacent the connector ports that displays port identification information and real-time patch cord connection information for each respective connector port, wherein displayed patch cord connection information for each connector port is dynamically updated by the controller as a patch cord is inserted and removed from a respective connector port; and
    wherein the real-time patch cord connection information includes identification of end points of a communications link including identification of a connector port on a switch.

2. The patch panel of claim 1, further comprising a user input device positioned adjacent to the electronic display, wherein the user input device is operably associated with the electronic display are configured to scroll multiple lines of information onto the electronic display in response to manipulation of the user input device by a user.

3. The patch panel of claim 2, wherein the user input device comprises a rotatable scroll wheel.

4. The patch panel of claim 1, wherein the electronic display is integrated with or visible through a front surface of the patch panel.

5. The patch panel of claim 4, wherein the electronic display is configured to display port identification information and patch cord connection information for a connector port directly adjacent to the respective connector port.

6. The patch panel of claim 5, wherein the electronic display is configured to display port identification information and patch cord connection information for a connector port directly above the respective connector port.

7. The patch panel of claim 1, wherein each connector port is configured to read an identifier of a patch cord connector inserted therewithin.

8. The patch panel of claim 1, wherein patch cord connection information displayed by the electronic display comprises a patch cord identifier.

9. The patch panel of claim 1, further comprising a user input device that is configured to toggle the electronic display in response to input from a user between a first mode in which port identification information is displayed and a second mode in which at least one end point of a communications link through a particular connector port is displayed.

10. The patch panel of claim 9, wherein the user input device comprises a scroll wheel, and wherein the scroll wheel is configured so that rotation of the scroll wheel selects different ones of the plurality of connector ports for which the at least one end point of the communications link through the selected connector port is displayed.

11. The patch panel of claim 1, wherein the electronic display is configured to display information in either TIA/EIA 606A compliant labels or in a custom labeling scheme.

12. The patch panel of claim 1, wherein the electronic display has a length that is substantially the same as a length of the plurality of connector ports.

13. The patch panel of claim 1, wherein the electronic display is a liquid crystal display (LCD), a light emitting diode (LED) display, a vacuum fluorescent display (VFD), or an organic light emitting diode (OLED) display.

14. The patch panel of claim 1, further comprising a plurality of arms extending outwardly away from a front surface of the patch panel, wherein the electronic display is attached to distal ends of the arms and positioned substantially in front of the connector ports.

15. The patch panel of claim 14, wherein the electronic display is configured to simultaneously display the port identification information and the real-time patch cord connection information for each connector port.

16. The patch panel of claim 1, wherein the electronic display is further configured to display power and/or temperature data.

17. A method of displaying patch cord connection information for a connector port of a patch panel in a communications patching system, comprising:
    detecting insertion of a patch cord connector in a first patch panel connector port;
    displaying on an electronic display adjacent the first patch panel connector port an identifier for the first patch panel connector port;
    detecting an identifier of the patch cord connector; and
    displaying in real time, via the electronic display, the detected patch cord connector identifier;
    detecting insertion of a connector at the opposite end of the patch cord in a second patch panel connector port; and
    displaying in real time, via the electronic display, an identification of the second patch panel connector port.

18. The method of claim 17, further comprising displaying identifications of end points of a communications link associated with the connector port.

19. An equipment mounting system, comprising:
    a frame configured to support equipment mounted thereto in a plurality of spaced-apart mounting locations;
    a plurality of patch panels mounted to the frame in spaced-apart locations;
    at least one controller associated with the plurality of patch panels, wherein the at least one controller monitors and logs patch cord connectivity for the plurality of patch panels; and
    a display removably secured to a side of the frame, wherein the display is configured to display patch cord connectivity information monitored by the at least one controller for the plurality of patch panels,
    wherein the patch cord connectivity information includes information identifying respective patch panel connector ports that receive the other ends of patch cords that are connected to the plurality of patch panels, and wherein the display comprises a touch screen display, and wherein a user may use the touch screen display to select one of the plurality of patch panels for which patch cord connectivity information is displayed on the touch screen display.

20. An equipment monitoring system, comprising:

a patch panel that includes a plurality of connector ports, wherein the patch panel comprises a passive patch panel that does not include sensors that are configured to sense when a patch cord connector is inserted into, or removed from, the plurality of connector ports;

a database that includes patch cord connectivity information for the plurality of connector ports;

an electronic display positioned adjacent the connector ports that is configured to display patch cord connectivity information that is received from the database for at least some of the plurality of connector ports, wherein the electronic display further is configured to display port identification information for the plurality of connector ports of the patch panel; and wherein the patch cord connection information includes identification of end points of a communications link including identification of a connector port on a switch.

21. The equipment monitoring system of claim 20, wherein the display is separate from the passive patch panel.

22. The equipment monitoring system of claim 20, wherein the display is retrofitted onto the passive patch panel.

23. The equipment mounting system of claim 19, wherein the display comprises a portable display of a wireless terminal.

* * * * *

UNITED STATES PATENT AND TRADEMARK OFFICE
CERTIFICATE OF CORRECTION

| | | |
|---|---|---|
| PATENT NO. | : 8,643,476 B2 | Page 1 of 1 |
| APPLICATION NO. | : 12/826118 | |
| DATED | : February 4, 2014 | |
| INVENTOR(S) | : Pinn et al. | |

It is certified that error appears in the above-identified patent and that said Letters Patent is hereby corrected as shown below:

In the Specification:
Column 10, Line 55 and 56: Please correct "the display 160'."
to read -- the display 160'''. --

Column 11, Line 20: Please correct "patch panel 112'."
to read -- patch panel 112'''. --

Signed and Sealed this
Seventh Day of October, 2014

Michelle K. Lee
*Deputy Director of the United States Patent and Trademark Office*